(12) United States Patent
Yagi et al.

(10) Patent No.: US 7,059,752 B2
(45) Date of Patent: Jun. 13, 2006

(54) VEHICULAR INFRARED LIGHT RADIATING LAMP

(75) Inventors: Seiichiro Yagi, Shizuoka (JP); Kazuki Okui, Shizuoka (JP)

(73) Assignee: Kioto Manufacturing Co., Ltd., Tokyo (JP)

( * ) Notice: Subject to any disclaimer, the term of this patent is extended or adjusted under 35 U.S.C. 154(b) by 218 days.

(21) Appl. No.: 10/647,325

(22) Filed: Aug. 26, 2003

(65) Prior Publication Data

US 2004/0042070 A1    Mar. 4, 2004

(30) Foreign Application Priority Data

Aug. 27, 2002    (JP) ............................ P.2002-246279

(51) Int. Cl.
    *B60Q 1/00*    (2006.01)
(52) U.S. Cl. ....................... 362/538; 362/296; 362/510
(58) Field of Classification Search ................ 362/510,
    362/516, 514, 519, 540, 546, 296, 335, 293,
    362/311, 507, 538–539; 399/336; 372/4
    See application file for complete search history.

(56) References Cited

U.S. PATENT DOCUMENTS

| | | | | |
|---|---|---|---|---|
| 4,651,257 | A | * | 3/1987 | Gehly ......................... 362/33 |
| 2001/0019482 | A1* | | 9/2001 | Kobayashi et al. ......... 362/510 |
| 2001/0050344 | A1* | | 12/2001 | Albou .................... 250/504 R |

FOREIGN PATENT DOCUMENTS

JP          2001-60403 A      3/2001

* cited by examiner

*Primary Examiner*—John Anthony Ward
*Assistant Examiner*—Robert May
(74) *Attorney, Agent, or Firm*—Sughrue Mion, PLLC (57) ABSTRACT

An infrared light radiating lamp in which red light emitted from a front lens is diluted so as to become inconspicuous by emitting a small amount of visible light from a rim portion of a convex lens so that the lamp will not be mistaken for a tail lamp or a stop lamp and without causing glare. A vehicular infrared light radiating lamp is provided with a light source unit including a convex lens mounted via a lens holder forward of a reflector in which a light source is mounted. An infrared light transmitting film is provided on the rear surface of the convex lens. An infrared light transmitting film-free region is provided on the outer periphery of the infrared light transmitting film such that white visible light for diluting the red light emitted from the convex lens is emitted from the rim portion of the convex lens. Visible light with a high energy density is blocked by a light shielding member provided on the rear of the ring-shaped infrared light transmitting film-free region such that only visible light with a reduced energy density, namely, light dampened in intensity by reflection from the infrared light transmitting film, reaches the infrared light transmitting film-free region. Therefore, visible light emitted from the rim portion of the convex lens with an adjusted light intensity does not create glare.

14 Claims, 10 Drawing Sheets

VEHICULAR INFRARED LIGHT RADIATING LAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular infrared light radiating lamp intended to be mounted on a vehicle for radiating infrared light forward of the vehicle, and more particularly relates to a vehicular infrared light radiating lamp used in common with a CCD camera having up to a near-infrared sensitivity.

A lamp of this type is constructed by arranging a visible light source and a parabolic reflector within a lamp chamber defined by a lamp body and a front lens. An infrared light transmitting filter, namely, a filter which reflects visible light components and transmits infrared light components, is formed over the entire surface of a glass plate disposed between the light source and the front lens with the entire front opening portion of the lamp chamber covered by the filter such that all light source light directed toward the front lens is transmitted through the infrared light transmitting film. Visible light components of the light source light reflected by the reflector of the lamp are cut when passing through the infrared light transmitting film while light composed primarily of invisible infrared light is emitted forward from the front lens.

The infrared light radiating region forward of the vehicle is sensed with a CCD camera having up to near-infrared sensitivity mounted on a front portion of the vehicle. The output of the camera is processed with an image processing device so as to produce a visual display on a monitor screen inside the passenger compartment of the vehicle. The driver is then able to confirm the presence of objects such as persons, lane markers, and obstacles in the distance on the monitor screen, which displays the field of vision in front of the vehicle.

Figure 11:
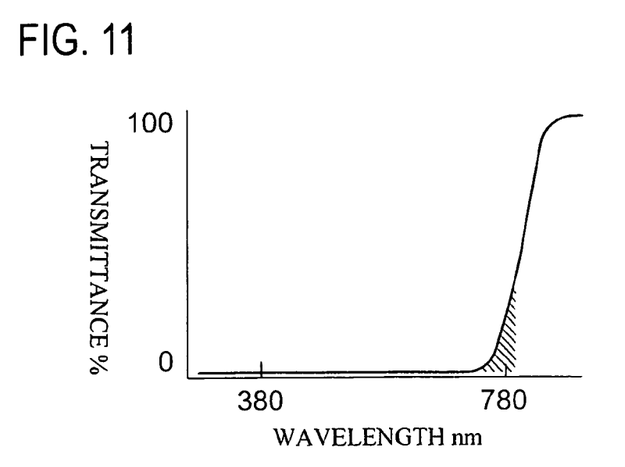
FIG. 11 is a graph showing spectral characteristics of an infrared light transmitting film used in a conventional infrared light radiating lamp.

The spectral characteristics of an infrared light transmitting filter for the above-described conventional infrared light radiating lamp are shown in FIG. 11. As shown by diagonal lines in FIG. 11, visible light (red light component) with a long wavelength of approximately 700 to 800 nm cannot be completely cut with the infrared light transmitting filter, and thus some visible light (red light component) passing through the infrared light transmitting filter together with the infrared light is also directed to the front lens. This portion of visible light (red light component) is emitted from the front lens together with the infrared light, so that the front lens emits red light to some extent and appears to a viewer as being lit red. This causes a safety problem in that the infrared light radiating lamp, which is mounted at the front portion of the vehicle, can be mistaken for a tail lamp or a stop lamp.

As disclosed in Japanese Patent Application No. 2001-205708, filed Jul. 6, 2001 (the "prior application"), the inventor earlier proposed a solution to this problem in which, by guiding a portion of light source light to the rim portion of the front lens without passing through the infrared light transmitting filter so as to emit white light from the rim portion of the front lens otherwise lit red, the red-colored light emitted from the lamp is diluted to the point where it become inconspicuous. This technique has been confirmed as effective in repeated test results.

Figure 12:
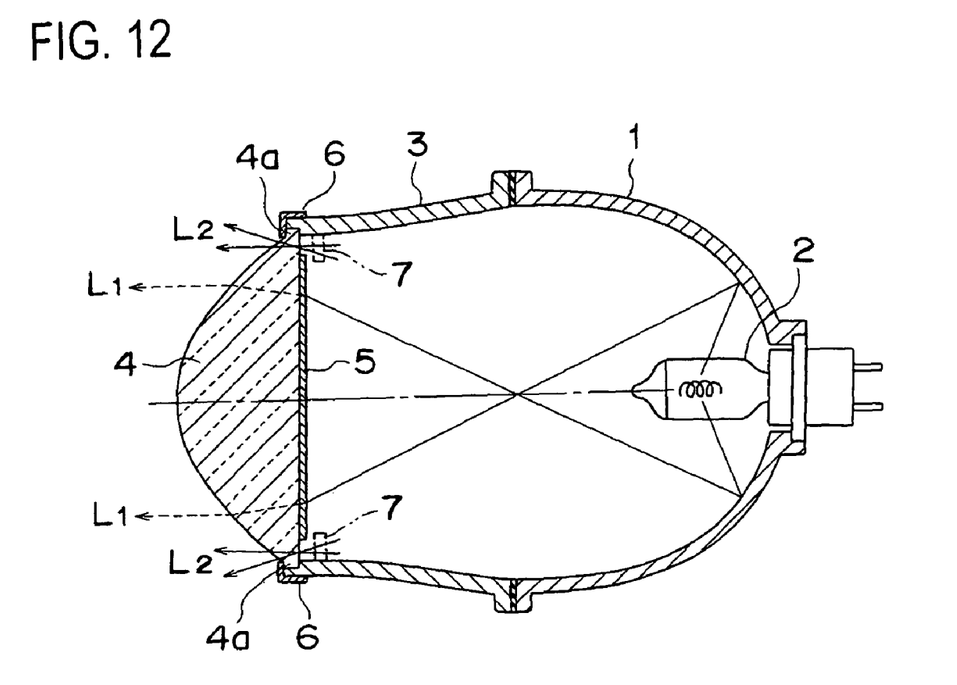
FIG. 12 is a longitudinal cross-sectional view of a main portion of an infrared light radiating lamp previously proposed by the inventor.

As disclosed in the prior application, for example, as shown in FIG. 12, a light source unit incorporating a convex lens 4 mounted via a tubular lens holder 3 is provided forward of a reflector 1 on which a bulb 2 is mounted. An infrared light transmitting film 5 is formed on regions other than a rim portion of a rear surface of the convex lens 4, and an infrared light transmitting film-free region 6 is formed around the rim portion of the rear surface of the convex lens 4. By emitting from the convex lens 4 an infrared light beam L1 from which visible light has been cut and emitting a visible light L2 from a convex lens rim portion 4a, the convex lens rim portion 4a emits white light such that the red light emission color of the convex lens 4 is diluted.

However, light with a relatively high energy density including direct light from the bulb 2 and reflected light from the reflector 1 and the lens holder 3 is directly incident on the infrared light transmitting film-free region 6 and emitted from the convex lens rim portion 4, thus creating the risk of creating light which causes a glare effect. Also, by increasing the area of the infrared light transmitting film 5 (i.e., narrowing the infrared light transmitting film-free region 6) formed on the rear surface of the convex lens 4, it is also possible to adjust the amount of visible light emitted from the convex lens rim portion 4a such that it does not create glare. However, such an adjustment is not so simple because the reduced light emission reduces the effect of diluting the red light emission.

The inventor considered that if the energy density of the visible light emitted from the convex lens rim portion 4a ere reduced glare would not be created. As shown by a broken line in FIG. 12, a light shielding member 7 was provided on the inner side of the lens holder 3 so as to cover the rear of the convex lens rim portion 4a (infrared light transmitting film-free region 6), and tests were repeated to confirm the effect thereof. As a result, it was confined that that the light emitted from the convex lens 4 did not appear red in color and glare was not created. The present invention is based on this discovery.

BRIEF SUMMARY OF THE INVENTION

It is an object of the present invention, created based upon problems with the above related art and the aforementioned discovery of the inventor, to provide an infrared light radiating lamp in which red light emitted from the front lens of the lamp is relatively dimmed and the lamp is not mistaken for a tail lamp or a stop lamp by emitting visible light from the rim portion of the convex lens in such a manner that glare is not created.

In order to achieve the above object, an infrared light radiating lamp according to the invention is provided with a light source unit incorporating a convex lens mounted via a tubular lens holder forward of a reflector on which a light source is mounted, with an infrared light transmissive traversing the light path between the reflector and the convex lens. An infrared light transmitting film-free region is provided along the outer periphery of the infrared light transmitting film, structured such that visible light is emitted from a rim portion of the convex lens, and a light shielding member covering the rear of the rim portion of the convex lens is provided on the lens holder.

The infrared light transmitting film can be formed on the rear surface of the convex lens, or the infrared light transmitting film can be formed on a transparent plate disposed to the rear of the convex lens. In a construction where the light shielding member is at a position behind the infrared light transmitting film, it is preferable for the light shielding member to cover the rear of the infrared light transmitting film-free region on the outer periphery of the infrared light transmitting film.

Light source light, including light emitted directly from the light source and light reflected by the reflector and the lens holder, directed toward the convex lens has visible light components cut by the infrared light transmitting film traversing the light path so as to emit mainly infrared light components, which are invisible to the naked eye, from the convex lens. However, visible light components (red light components) that are not cut by the infrared light transmitting film are also included in the light emitted from the convex lens, and therefore the lens emits some red light when the lamp is lit. On the other hand, light source light (visible light) that does not pass through the infrared light transmitting film reaches the rim portion of the convex lens via the infrared light transmitting film-free region, and therefore the rim portion of the convex lens emits white light which dilutes the red light emitted from the convex lens. That is, the amount of red light emitted from the convex lens is approximately the same as in the case of the conventional structure where all of the light source light directed toward the convex lens passes through the infrared light transmitting film. However, the red light is relatively dimmed by the white light emitted from the rim portion of the region of the convex lens that emits red light.

To eliminate the risk of causing glare with the visible light emitted from the rim portion of the convex lens, however, in the construction where the infrared light transmitting film is formed on the rear surface of the convex lens, light source light (visible light) with a high energy density directed from the rear toward the infrared light transmitting film-free region is blocked by the light shielding member and not directed toward the infrared light transmitting film-free region, and only light (visible light) with a low energy density dampened by repeated reflecting, including reflecting by the infrared light transmitting film and further reflecting by the light shielding member, reaches the infrared light transmitting film-free region. Therefore, white light source light (visible light) with a low energy density is emitted from the rim portion of the convex lens, which is effective for diluting the red light emitted from the convex lens while not creating glare because of its low light intensity. Also in the case where the infrared light transmitting film is formed on a transparent plate disposed to the rear of the convex lens and the light shielding member is provided on the rear of the transparent plate disposed adjacent to the convex lens, results identical to those described above can be obtained.

In the case where the light shielding member is provided between the convex lens and the transparent plate in a construction where the infrared light transmitting film is formed on a transparent plate disposed to the rear of the convex lens, light source light (visible light) with a high energy density directed from the rear toward the rim portion of the convex lens is blocked by the light shielding member and prevented from reaching the rim portion of the convex lens, and only light (visible light) with a low energy density due to repeated reflection by the rear surface of the convex lens and the front surface of the transparent plate reaches the rim portion of the convex lens. Therefore, white light source light (visible light) with a low energy density is emitted from the rim portion of the convex lens, which is effective for diluting the red light emitted from the convex lens while avoiding the creation of glare because of its low intensity.

The infrared light radiating lamp can be structured such that the infrared light transmitting film is formed on the rear surface of the convex lens.

Since in such a case the infrared light transmitting film is formed directly on the convex lens, because no transparent plate for forming the infrared light transmitting film is necessary, the lamp structure is further simplified. In addition, compared to the case in which a separate infrared light transmitting filter is provided, because the interior of the light source unit is less prone to heat up excessively, heat-induced deterioration of the infrared light transmitting film is suppressed.

As previously mentioned, the infrared light transmitting film can also be formed on a transparent plate disposed to the rear of the convex lens.

In such a construction in which the infrared light transmitting filter (transparent plate on which the infrared light transmitting film is formed) is disposed to the rear of the convex lens, if, for example, the visible light cutting performance of the infrared light transmitting filter is reduced due to temperature-induced damage, only the infrared light transmitting filter can be replaced without replacing other main components of the lamp.

Further, the light shielding member can be formed in a stepped configuration extending toward the inner side of a lens engaging portion provided on the front edge portion of the lens holder.

In general, die-cast aluminum tends to be used to manufacture the lens holder due to its formability, heat durability, and the like. The lens engaging portion and the light shielding member are integrally formed, extending in a stepped configuration on the front edge portion of the lens holder. In such a construction, therefore, compared to cases where the light shielding member is constructed as a separate member, the structure is simpler, with accompanying ease of manufacturing and no increase in weight.

The extending end portion of the light shielding member can be formed in a tapered shape.

When visible light (light source light) reflected by the end face on the extending end portion of the light shielding member is obliquely incident on the infrared light transmitting film, arc-shaped stripes may appear lit red by the light emitted from the convex lens. However, since the tapered extending end portion of the light shielding member does not have an end face with which to reflect visible light (light source light) towards the convex lens, the light source light is not obliquely incident on the infrared light transmitting film, and hence there is no risk of the convex lens appearing lit red.

Still further, the extending end portion of the light shielding member can be treated with a blackening treatment.

When visible light (light source light) reflected by the end face of the extending end portion of the light shielding member is obliquely incident on the infrared light transmitting film, arc-shaped stripes may appear lit red by the light emitted from the convex lens. However, visible light (light source light) is almost completely absorbed by the blackened end face of the extending end portion of the light shielding member and thus is not reflected toward the convex lens. Therefore, the light source light is not obliquely incident on the infrared light transmitting film, and hence there is no risk of the convex lens appearing lit red.

DETAILED DESCRIPTION OF THE INVENTION

Next, a description of preferred embodiments of the present invention will be given.

Figure 1:
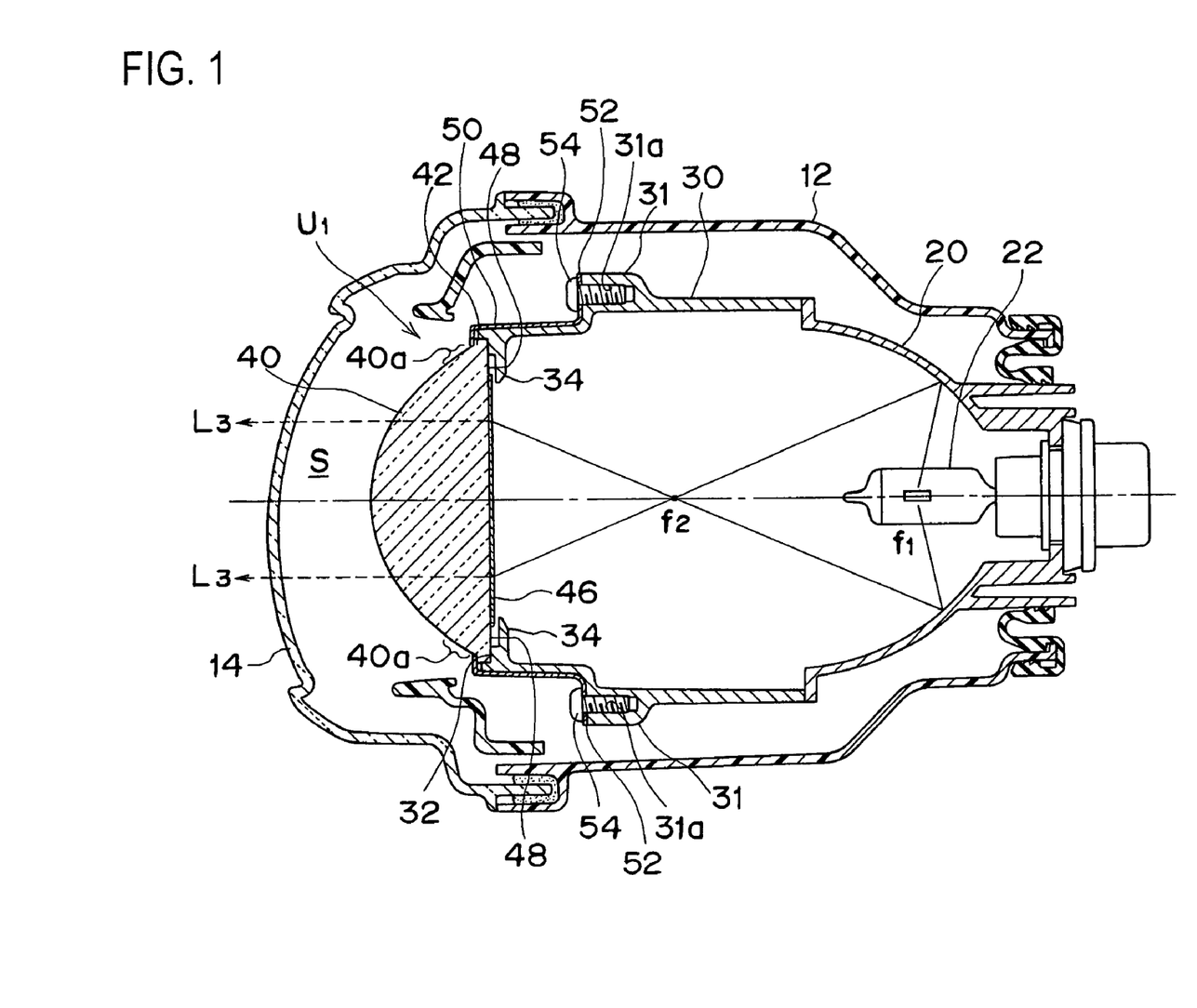
FIG. 1 is a longitudinal cross-sectional view of an infrared light radiating lamp constructed according to a first embodiment of the present invention.
Figure 2:
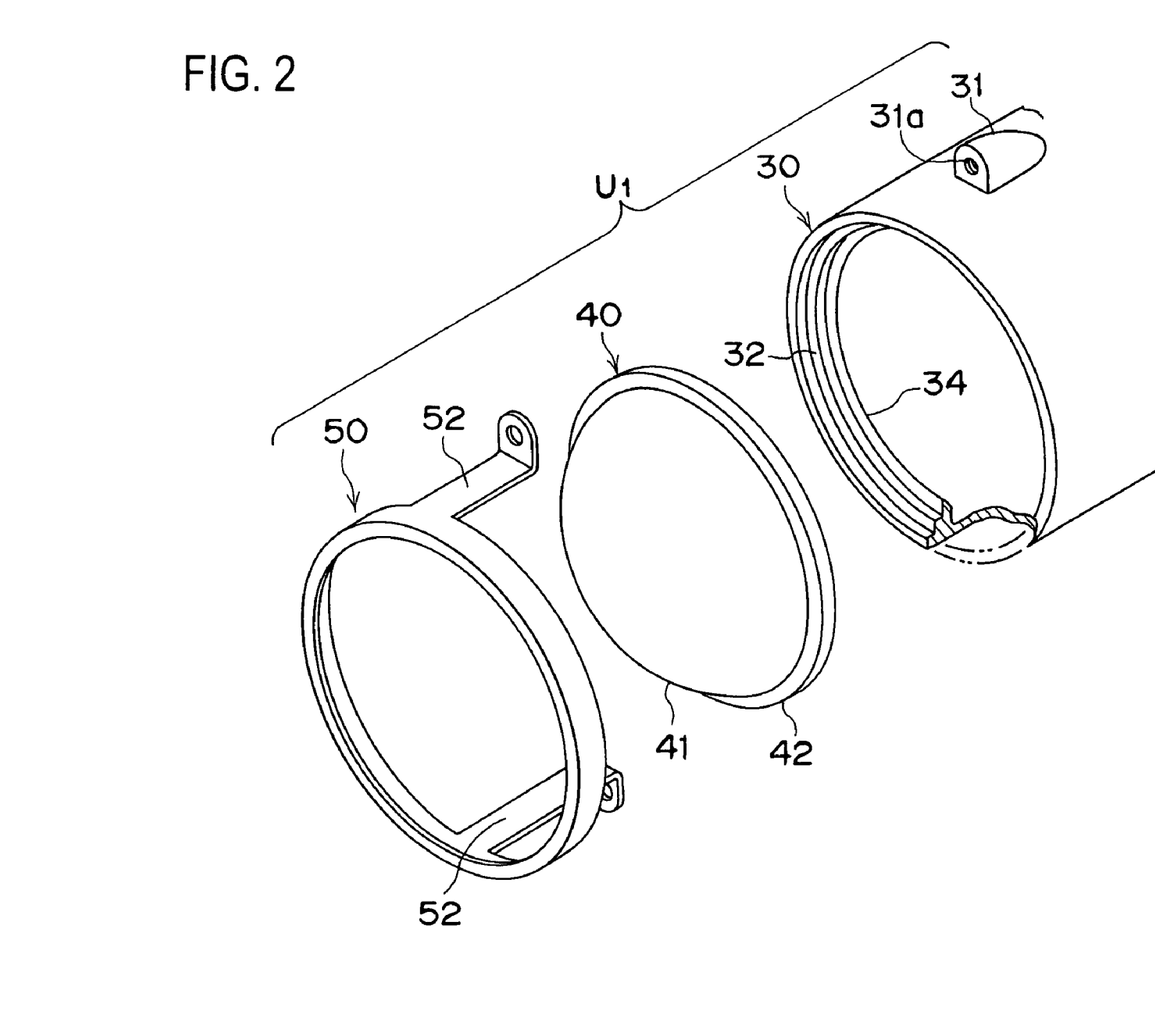
FIG. 2 is an exploded perspective view of a front end portion of a light source unit constituting a main portion of the lamp.
Figure 3A:
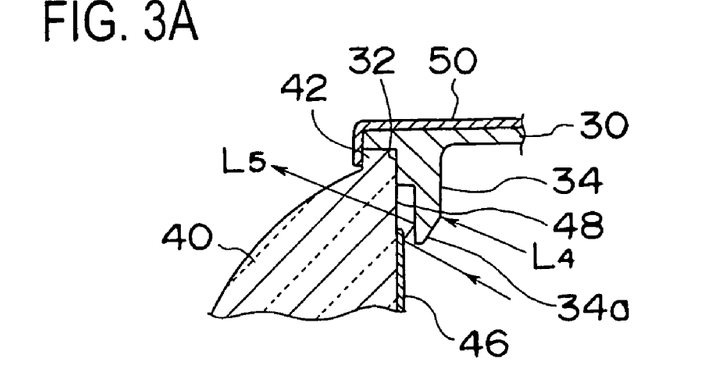
FIGS. 3A and 3B are enlarged cross-sectional views of a lens engaging portion on a front edge portion of a lens holder of the lamp.
Figure 3B:
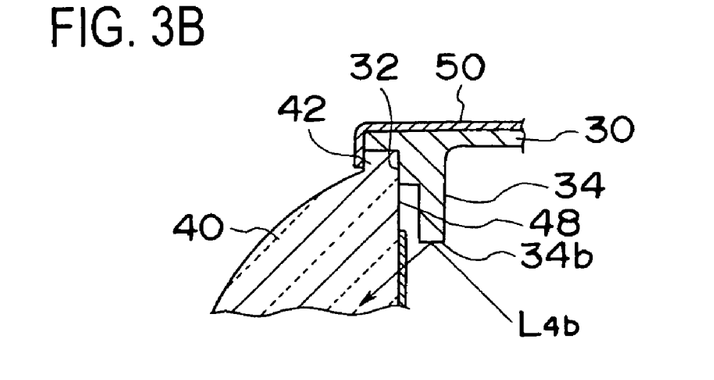

FIGS. 1, 2, 3A and 3B show an embodiment of an infrared light radiating lamp, suitable for application to a night forward visibility detection system which includes an infrared CCD camera, for example, mounted at an upper portion within the passenger compartment of the vehicle, which senses the field of vision in front of a vehicle. FIG. 1 is a longitudinal cross-sectional view of an infrared light radiating lamp according to a first embodiment of the present invention, FIG. 2 is an exploded perspective view around a front end portion of a light source unit constituting a main portion of the lamp, and FIG. 3A and 3B are enlarged cross-sectional views around a lens engaging portion on a front edge portion of a lens holder of the lamp, of which FIG. 3A is an enlarged cross-sectional view of an end portion of a light shielding member of the lamp, and FIG. 3B is an enlarged cross-sectional view of an end portion of the light shielding member.

The night forward visibility detection system includes an infrared light radiating lamp 10A mounted at a front portion of a vehicle and radiating infrared light forward of the vehicle, an infrared CCD camera (not shown), for example, mounted at an upper portion inside a passenger compartment of the vehicle that senses a field of vision forward of the vehicle, an image processing and analyzing device for analyzing images sensed by the CCD camera, and a heads-up display (HUD) for displaying data analyzed by the image processing and analyzing device.

Images sensed by the CCD camera, such as images of pedestrians, obstacles and lane markers in the distance, which are not visible to the naked eye, are sent to the image processing and analyzing device. It is possible to recognize pedestrians, obstacles, lane markers, and the like by conducting edge processing and pattern recognition based on those images. Visible images of the pedestrians, obstacles, lane markers, etc., are constructed and then displayed to the drivel on the heads-up display (HUD). It is also possible to notify the driver of the presence of such objects by an audio signal.

The infrared light radiating lamp 10A, as shown in FIG. 1, includes a vessel-shaped lamp body 12 made of synthetic resin with an open front side, a transparent front cover 14 attached to the front opening portion of the lamp body 12 and defining a lamp chamber S together with the lamp body 12, and a projection-type light source unit U1 accommodated within the lamp chamber S and tiltably supported in vertical and horizontal directions by an aiming mechanism (not shown).

The light source unit U1 is constructed with a substantially ellipsoid reflector 20 which supports a bulb 22 acting as a light source. The light source unit U1 is made of die-cast aluminum, and a convex lens 40 is mounted to the front of the reflector 20 via a tubular lens holder 30. The reflecting surface of the reflector 20 is formed by aluminum vapor deposition. By positioning the filament of the bulb 22 at the first focal point f1 of the reflector 20 and positioning the rear focal point of the convex lens 40 at the second focal point f2 of the reflector 20, light source light reflected by the reflecting surface is projected as a substantially parallel light flux L3 by the convex lens 40. That is, the light distribution pattern created by the light source unit U1 is suitable for forming a headlamp high beam.

The lens holder 30 is made of die-cast aluminum, similar to the reflector 20, and a lens engaging portion 32 with an inner flange shape capable of engaging an outer peripheral flange portion 42 of the convex lens 40 is provided around a front edge portion of the lens holder 30. A metal lens holding frame 50 with a toric shape covers the front edge portion of the lens holder 30, and the outer peripheral flange portion 42 of the convex lens 40 is fixed and supported in a state in which it is engaged with the lens engaging, portion 32. Reference numerals 31 denote a pair of female-threaded bosses formed at the top and bottom at the outer periphery of the lens holder 30. By screwing a screw 54 into a female-threaded portion 31a, a pair of legs 52 of the lens holding frame 50 are fixed to the boss 31 so that the lens holding frame 50 covers the front edge potion of the lens holder 30.

An infrared light transmitting film 46 that reflects visible light and transmits infrared light is formed in a circular shape by vapor deposition on regions other than the rim portion of the rear surface of the convex lens 40. Infrared light from which visible light has been cut is emitted from the convex lens 40 by passing through the infrared light transmitting film 46. A ring-shaped infrared light transmitting film-free region 48 capable of transmitting light source light directly is provided on the rim portion of the rear surface of the convex lens 40 (the outer periphery of the circular infrared light transmitting film 46). Visible light (white light) L5 for diluting the red light emitted from the convex lens 40 is thus emitted from a rim portion 40a of the convex lens 40.

A light shielding member 34, extending in a stepped configuration, is provided around an inner side of the lens engaging portion 32 of the lens holder 30. The light shielding member 34, formed in a continuous manner on the lens engaging portion 32, extends in an inner flange shape so as to cover the rear of the infrared light transmitting film-free region 48, thereby to shield light directed toward the infrared light transmitting film-free region 48 from the rear such that only light with a low energy density that will not cause glare reaches the infrared light transmitting film-free region 48.

Namely, light source light, including both light coming directly from the bulb 22 and light reflected by the reflector 20 and the lens holder 30, directed toward the convex lens 40 has visible light components cut upon passing through the infrared light transmitting film 46 formed on the rear surface of the convex lens 40 so that the light emitted from the lens 40, as indicated by reference numeral L3 in FIG. 1, is composed primarily of infrared light components invisible to the naked eye. However, visible light components (red light components) that are not cut by the infrared light transmitting film 46 are also included in the light L3 emitted from the convex lens 40, as a result of which the convex lens 40 emits some red light when the lamp is lit. However, light source light (visible light) L5 that does not pass through the infrared light transmitting film-free region 48 reaches the rim portion of the convex lens 40 via the infrared light transmitting film-free region 48 so that the rim portion of the convex lens 40 emits white light, which acts to dilute the red light emitted from the convex lens 40. More specifically, the amount of red light emitted from the convex lens 40 is approximately the same as in the case of the conventional structure where all light source light directed toward the convex lens 40 passes through the infrared light transmitting film 46. However, with the invention the red light is diluted by the white light emitted from the rim portion of the region of the convex lens 40 that emits red light.

In particular, light source light (visible light) L4 with a high energy density coming from the light source directly toward the infrared light transmitting film-free region 48 is blocked by the light shielding member 34, preventing it from reaching the infrared light transmitting film-free region 48 in a direct path, and, as shown by reference numeral L5, only light (visible light) with a reduced energy density dampened by repeated reflecting, including reflecting off the infrared light transmitting film 46 and further reflecting by the light shielding member 34, reaches the infrared light transmitting film-free region 48. Therefore, only white light source light (visible light) L5 with a low energy density is emitted from the rim portion 40a of the convex lens 40, which is effective for diluting the red light emitted from the convex lens 40 while preventing glare because of its low light intensity.

If an end face 34b of an extending end portion of the light shielding member 34 is formed in a ring shape with a predetermined width as shown in FIG. 3B, visible light (light source light) L4b reflected by the end face 34b of the extending end portion of the light shielding member 34 is made obliquely incident on the infrared light transmitting film 46, and such light may be visible as arc-shaped red stripes when emitted from the convex lens 40. However, in the present embodiment, the extending end portion 34a of the light shielding member 34 is preferably formed in a tapered shape so as not to reflect significant amounts of light toward the convex lens 40. Therefore, visible light (light source light) is not obliquely incident on the infrared light transmitting film 46, and the problem of the convex lens 40 appearing lit with light in arc-shaped red stripes does not occur.

Figure 4:
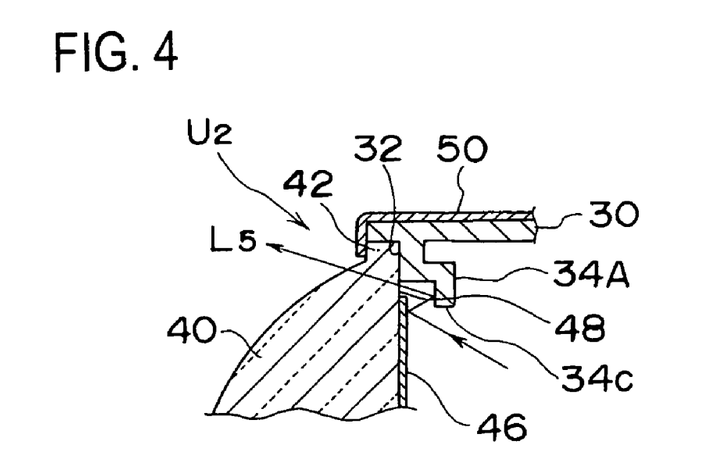
FIG. 4 is an enlarged cross-sectional view of a lens engaging portion on a front edge portion of a lens holder of a light source unit constituting a main portion of an infrared light radiating lamp according to a second embodiment of the present invention.

FIG. 4 is an enlarged cross-sectional view (a view corresponding to FIG. 3A) showing the lens engaging portion on the front edge portion of the lens holder of the light source unit constituting a main portion of the infrared light radiating lamp according to a second embodiment of the present invention.

In a light source unit U2 of the second embodiment, identical to the light source unit U1 of the first embodiment, an inner flange-shaped light shielding member 34A is provided around the inner side of the lens engaging portion 32 formed on a front edge portion of the lens holder 30 made of die-cast aluminum. An end face 34c extending in a ring shape in the circumferential direction with a predetermined width is formed on an extending end portion of the light shielding member 34A. However, the end face 34c is made non-reflective by a blackening treatment with black paint or the like, or provided with an alumite treatment or the like, so that light coming from the rear is not reflected toward the convex lens 40. That is, light incident on the blackening-treated end face 34c is almost completely absorbed and not reflected toward the convex lens 40, and therefore the problem of the convex lens 40 appearing lit with light in arc-shaped red stripes does not occur.

Other structures are the same as in the above first embodiments and therefore identical reference numerals are employed to omit redundant descriptions.

Figure 5:
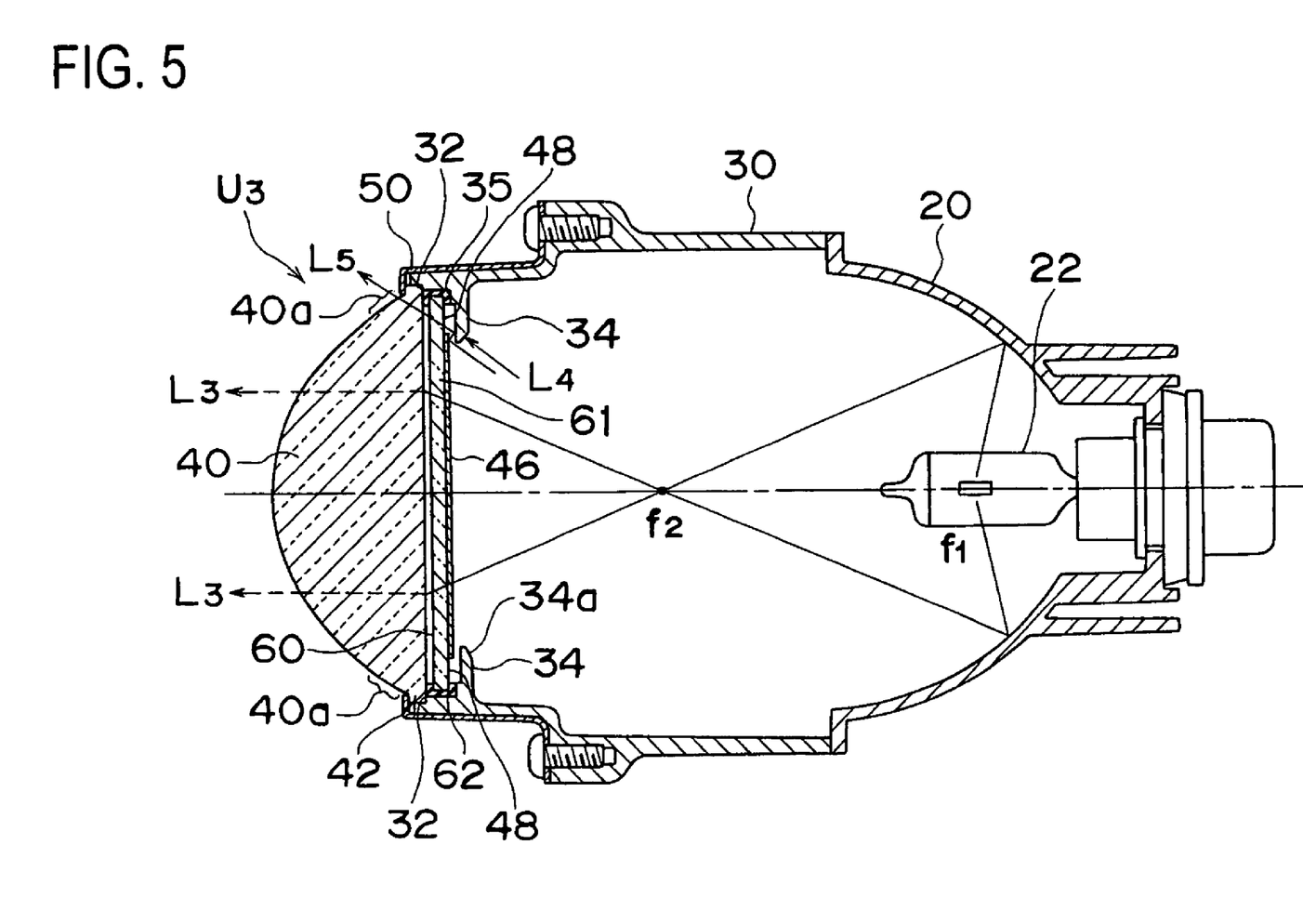
FIG. 5 is a longitudinal cross-sectional view of a light source unit constituting a main portion of an infrared light radiating lamp according to a third embodiment of the present invention.
Figure 6:
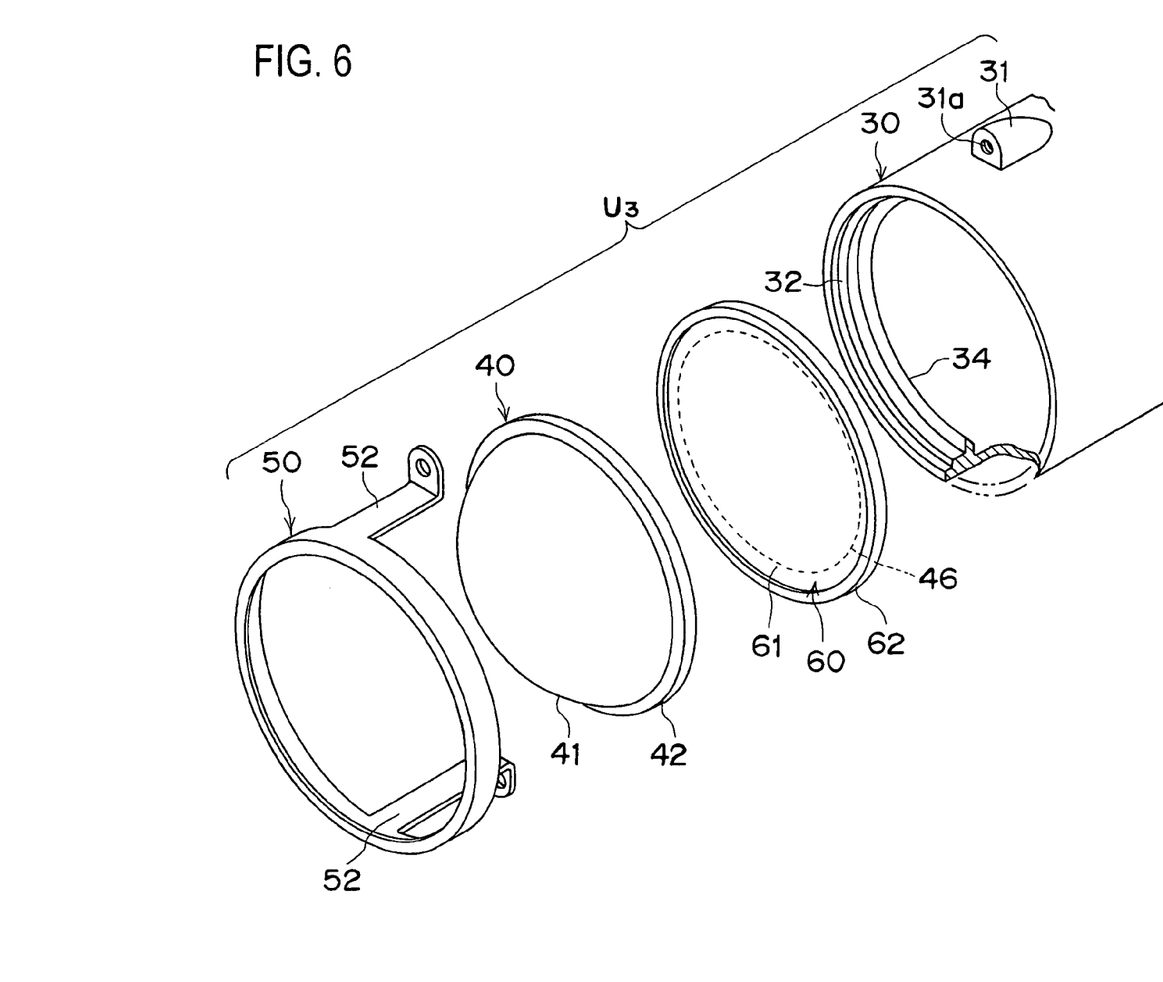
FIG. 6 is an exploded perspective view of a front end portion of the light source unit of FIG. 5.

FIGS. 5 and 6 show an infrared light radiating lamp according to a third embodiment of the present invention. FIG. 5 is a longitudinal cross-sectional view of the light source unit constituting a main portion of the lamp, and FIG. 6 is an exploded perspective view of a front end portion of the light source unit that constitutes a main portion of the lamp.

In the light source units of the above first and second embodiments the infrared light transmitting film 46 is formed directly on the convex lens 40; however, in the light source unit U3 of the third embodiment an infrared light transmitting filter 60 is disposed adjacent the rear of the convex lens 40.

Namely, the infrared light transmitting filter 60 is composed of the infrared light transmitting film 46 formed on a surface excluding a rim portion on a rear side of a transparent glass plate 61. Thus, a ring-shaped infrared light transmitting film-free region 48 with a predetermined width is provided on the rim portion of the infrared light transmitting filter 60 (glass plate 61). Further, a filter engaging portion 35 is provided on the inner side of the lens engaging portion 32 on the front edge portion of the lens holder 30, and the inner flange-shaped light shielding member 34 is provided on the inner side of the filter engaging portion 35. The infrared light transmitting filter 60 accommodated in the filter engaging portion 35 is fixed and held, together with the convex lens 40, to the front edge portion of the lens holder 30 by the lens holding frame 50. Reference numeral 62 denotes a rubber material with a U-shaped cross section provided around the rim portion of the infrared light transmitting filter 60, whereby the infrared light transmitting filter 60 and the convex lens 40 are disposed separated by an amount equal to the thickness of the rubber material 62.

The light shielding member extends so as to cover the rear of the infrared light transmitting film-free region 48 of the filter, blocking light directed from the rear toward the infrared light transmitting film-free region 48 such that only light with a low energy density that does not create glare reaches the infrared light transmitting film-free region 48. Accordingly, the convex lens 40 emits red light when the lamp is lit due to visible light components (red light components) that are cut by the infrared light transmitting film 46 and are included in the light L3 emitted from the convex lens 40. However, the rim portion 40*a* of the convex lens 40 emits white light, which acts to dilute the red light emitted from the convex lens 40.

That is, the light source light (visible light) L4 with a high energy density coming directly from the rear toward the infrared light transmitting film-free region 48 is blocked by the light shielding member 34, while a portion of light source light becomes light (visible light) L5 with a low energy density dampened by repeated reflecting, including reflecting by the infrared light transmitting film 46 and further reflecting by the light shielding member 34 before reaching the infrared light transmitting film-free region 48. Therefore, only the light (visible light) L5 with a low energy density reaches the rim portion of the convex lens 40, and white light source light (visible light) L5 with a low energy density is emitted from the rim portion 40*a* of the convex lens 40, which dilutes the red light emitted from the convex lens 40. This light does not create glare because of its low light intensity.

Furthermore, the filter 60 is provided in a position sufficiently separated in front from the second focal point position f2, which focuses light and reaches a high temperature, and thus the infrared light transmitting film 46 is protected from heat-induced damage.

Furthermore, the infrared light transmitting filter 60 can be mounted at the same time the convex lens 40 is attached to the lens holder 30, which is convenient when assembling the light source unit.

The remaining structures are the same as in the above first embodiment, and therefore identical reference numerals are employed to omit redundant descriptions.

Figure 7:
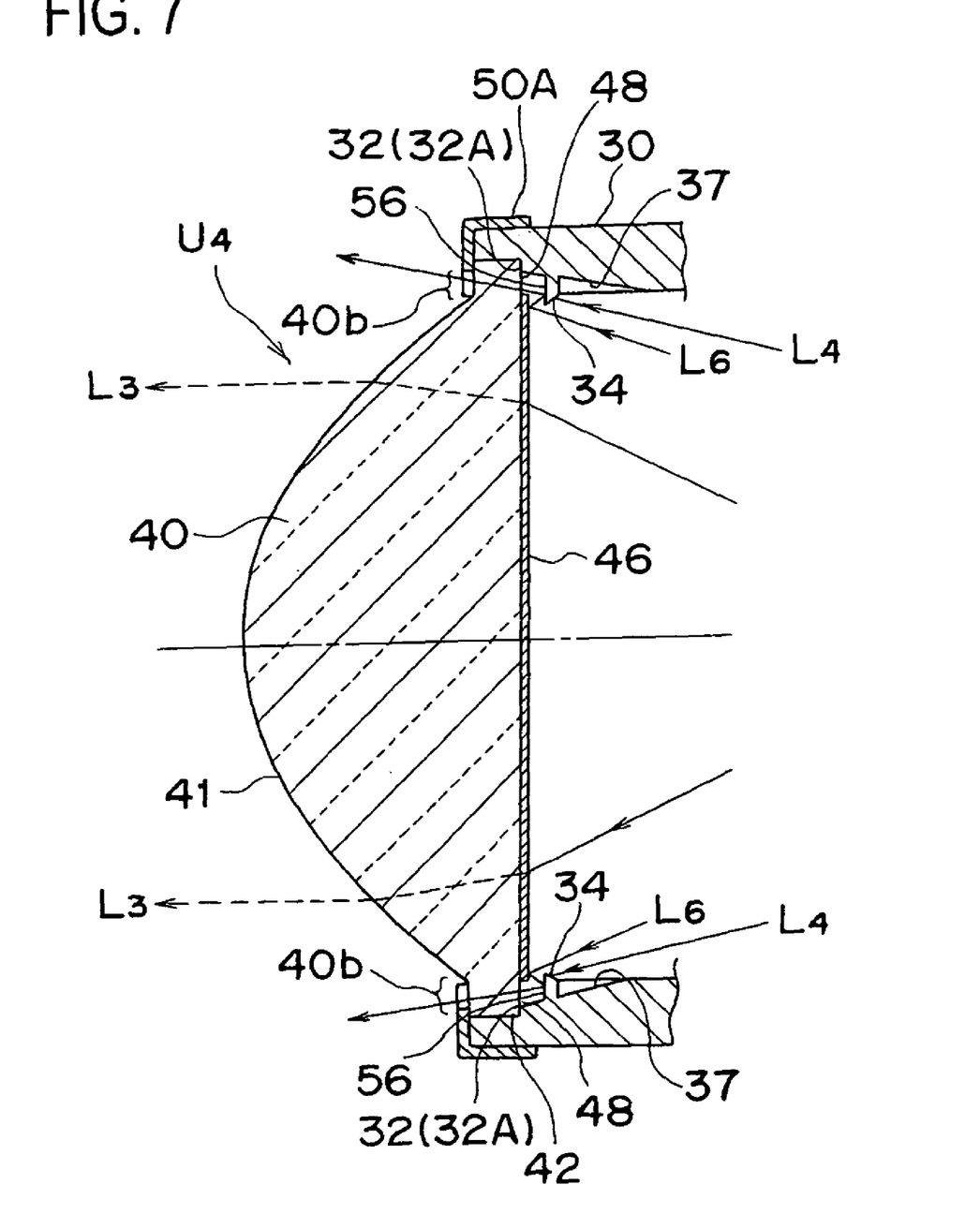
FIG. 7 is a longitudinal cross-sectional view of a light source unit constituting a main portion of an infrared light radiating lamp according to a fourth embodiment of the present invention.
Figure 8:
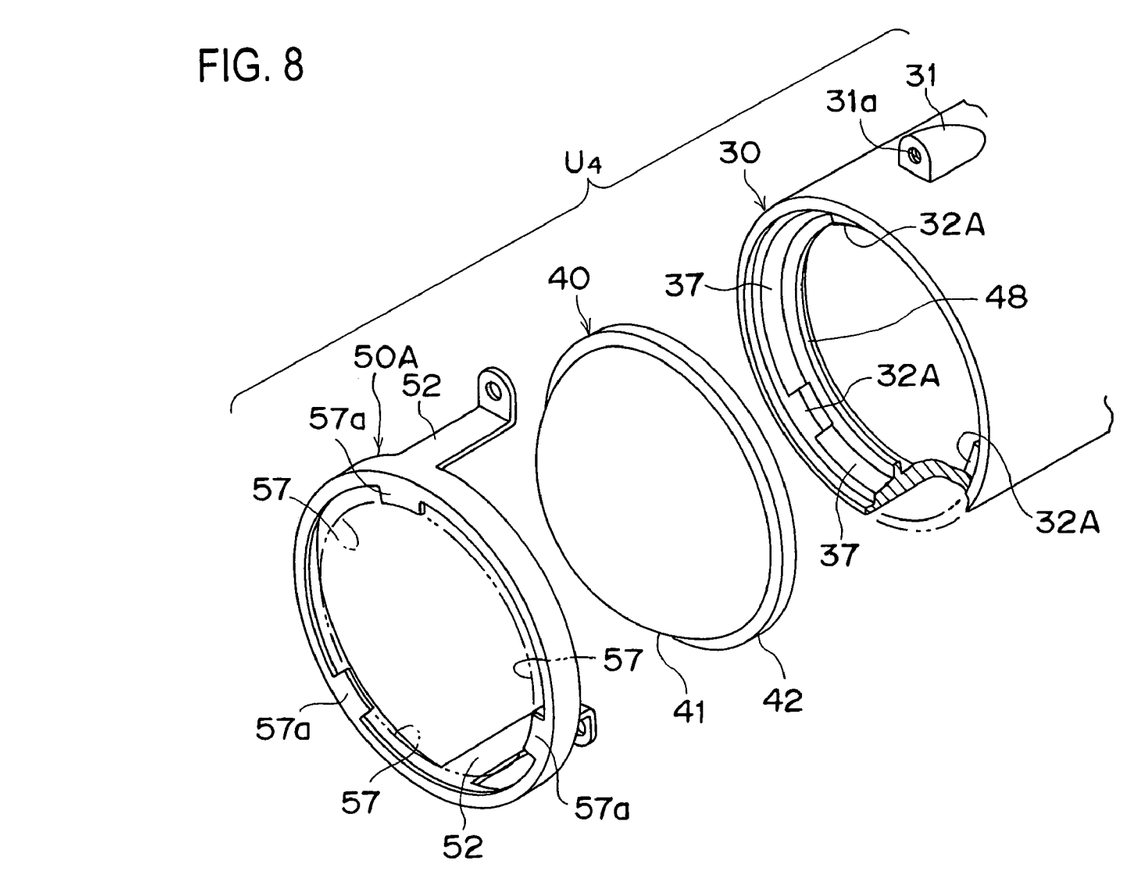
FIG. 8 is an exploded perspective view of a front end portion of the light source unit of FIG. 7.

FIGS. 7 and 8 show a fourth embodiment of the present invention. FIG. 7 is a longitudinal cross-sectional view of a main portion of the light source unit of the infrared light radiating lamp, and FIG. 8 is an exploded perspective view of the same.

In the light source unit of the infrared light radiating lamp of the fourth embodiment, the infrared light transmitting film 46 is formed in regions except for the flange portion 42 on the rear surface of the convex lens 40. Namely, the infrared light transmitting film 46 is formed on the rear surface corresponding to the convexly shaped protruding lens portion 41 on the front side of the convex lens 40, and the infrared light transmitting film-free region 48 is provided on the outer peripheral flange portion 42 of the convex lens 40.

Further, step portions 32A for mounting the lens are formed at three locations equally spaced in the circumferential direction on the lens engaging portion 32 on the front edge of the lens holder 30, and are notched in an arc shape when frontally viewed with tapered inner peripheral surfaces 37 diametrically expanding forward at the three locations equally spaced in the circumferential direction, whereby light source light passing through the infrared light transmitting film-free region 48 reaches the outer peripheral flange portion 42 of the convex lens 40.

In addition, on a lens holding frame 50A covering the front edge portion of the lens holder 30, which fixes and holds the flange portion 42 of the convex lens 40 to the lens engaging portion 32, three locations equally spaced in the circumferential direction on an inner rim portion of the lens holding frame 50A are notched in an arc shape, as indicated by reference numerals 57 in FIG. 8, and three tabs 57*a* corresponding to the step portions 32*a* for mounting the lens are provided. Thus, light source light directed to the outer peripheral flange portion 42 of the lens is emitted forward without being blocked by the lens holding frame 50A.

When the lamp is lit, light source light reflected by the reflector 20, as shown by reference numeral L3 in FIG. 7, has visible light components cut upon passing through the infrared light transmitting film 46 so that the light emitted from the lens 40 is mainly composed of infrared light components invisible to the naked eye. However, visible light components (red light components) that are cut by the infrared light transmitting film 46 are also included in the light emitted from the convex lens 40, and therefore the convex lens 40 emits some red light when the lamp is lit. In addition, light source light directed from the rear toward the infrared light transmitting film-free region 48 is blocked by the light shielding member 34. However, as shown by reference numeral L6 in FIG. 7, light source light with reduced energy density dampened due to reflecting by the infrared light transmitting film 46 and further reflecting by the front surface 56 of the light shielding member 34, reaches the infrared light transmitting film-free region 48. Therefore, light source light (white light) with a reduced energy density is emitted from a rim portion 40*b* of the convex lens 40. Thus, the red light emitted from the convex lens 40 is diluted to the point that it is rendered inconspicuous, and no glare is caused.

Figure 9:
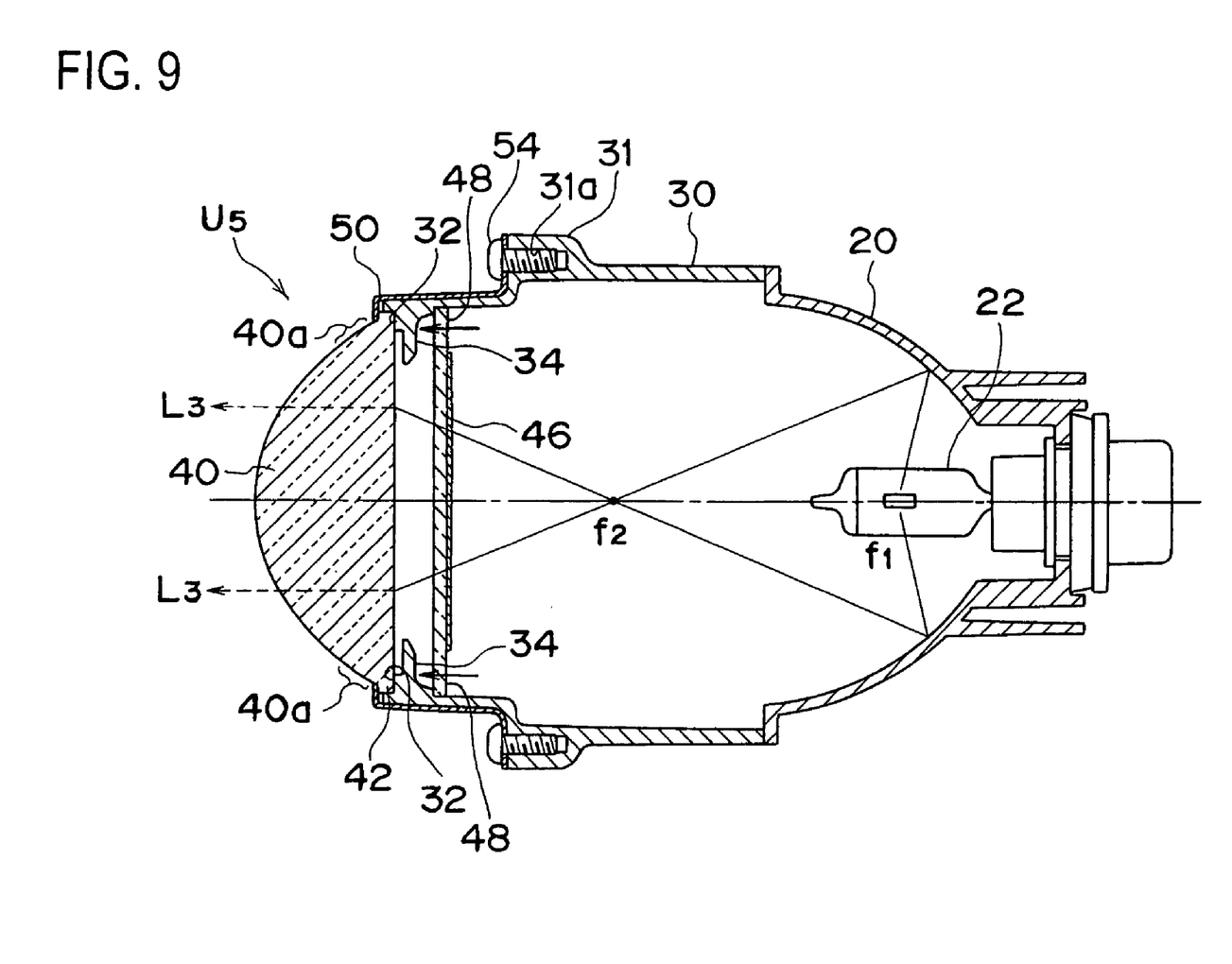
FIG. 9 is a longitudinal cross-sectional view of a light source unit constituting a main portion of an infrared light radiating lamp according to a fifth embodiment of the present invention.

FIG. 9 is a longitudinal cross-sectional view of a light source unit constituting a main portion of the infrared light radiating lamp according to a fifth embodiment of the present invention.

In a light source unit U5 of the infrared light radiating lamp according to the fifth embodiment, the infrared light transmitting film 46 is formed on the transparent glass plate 61 rather than directly on the convex lens 40, as in the light source unit U3 in the third embodiment described above. Compared to the third embodiment in which the infrared light transmitting filter 60 (infrared light transmitting film 46) is disposed closely adjacent to the rear of the convex lens 40, the infrared light transmitting filter 60 (infrared light transmitting film 46) is disposed at a position substantially separated from the rear of the convex lens 40 in the present embodiment.

Furthermore, the light shielding member 34 is provided around the inner side of the lens engaging portion 32, that is, the light shielding member 34 is provided to the rear of the rim portion of the convex lens 40, whereby the amount of light source light (visible light) emitted from the rim portion 40*a* of the convex lens 40 is suitably adjusted.

Namely, due to visible light components (red light components) that are not cut by the infrared light transmitting film 46 and are included in the light L3 emitted from the convex lens 40, the convex lens 40 emits some red light when the lamp is lit; however, the rim portion 40*a* of the convex lens 40 emits white light, which acts to dilute the red light emitted from the convex lens 40. In particular, the light source light (visible light) with a high energy density passing through the infrared light transmitting film-free region 48 around the rim of the infrared light transmitting filter 60 from the rear and coming directly toward the rim portion of the convex lens 40 is prevented from reaching the rim portion of the convex lens 40 due to shielding by the light shielding member 34, and only light (visible light) with a reduced energy density, dampened by repeated reflecting by the rear surface of the convex lens 40 and the front surface of the transparent plate 61, reaches the rim portion of the convex lens 40. Therefore, only white light source light (visible light) with a low energy density is emitted from the rim portion 40a of the convex lens, thereby diluting the red light emitted from the convex lens 40 while preventing glare because of its low light intensity.

In the above-described embodiments the infrared light transmitting film 46 is formed on the rear surface of the convex lens 40 or on the rear surface of the glass plate 61. However, the infrared light transmitting film may be formed only on the front surface side of the convex lens 40 or on the front surface side of the glass plate 61, or on both the front surfaces and rear surfaces.

Figure 10A:
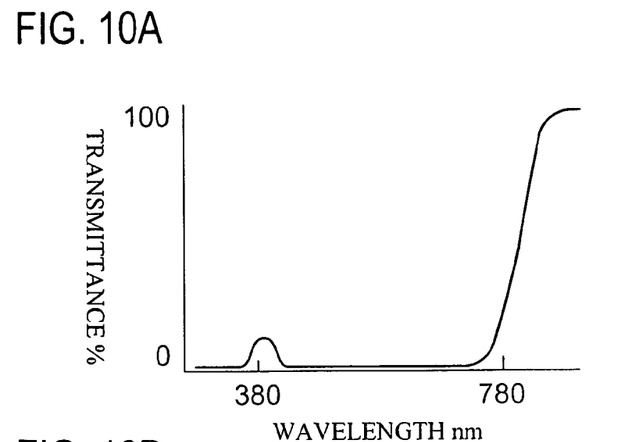
FIGS. 10A and 10B are graphs showing spectral characteristics of an infrared light transmitting film used in an infrared light radiating lamp of the invention.
Figure 10B:
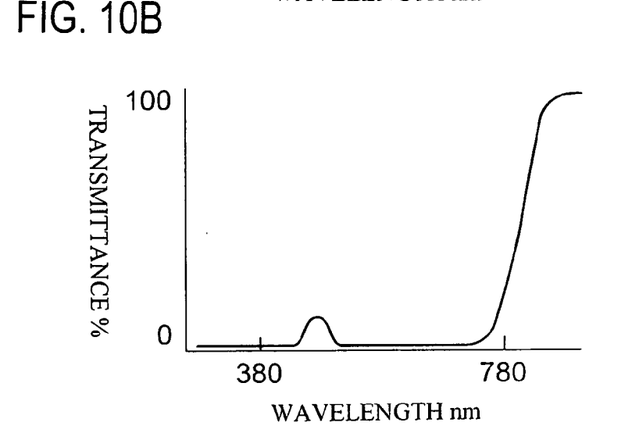

Furthermore, since the infrared light transmitting film 46 formed on the convex lens 40 or the transparent plate 61 is not capable of completely eliminating red components, by using an infrared light transmitting film with the spectral characteristics shown FIGS. 10A and 10B in place of the infrared light transmitting film 46 formed on the convex lens 40 or the transparent plate 61, red light emitted from the convex lens 40 can be better eliminated.

More specifically, the infrared light transmitting film is generally a multi-layered structure in which a plurality of films are laminated upon one another. By adjusting the film thickness and number of films constituting the infrared light transmitting film, while spectral characteristics with respect to red components are identical to that in FIG. 11, a blue light passing infrared light transmitting film (FIG. 10A) or a green light passing infrared light transmitting, film (FIG. 10B) can be obtained. With such a filter, the red light emitted from the convex lens 40 is made less conspicuous through blending with the blue light or the green light passed through the filter, in addition to being diluted by the white light emitted from the lens rim portion.

As evident from the above description, red light emitted when the lamp is lit is diluted by the white light emitted from the lens rim portions so that the lamp does not appear red as in the conventional case. Therefore, there is no risk of drivers or pedestrians mistaking the infrared light radiating lamp as a tail lamp or stop lamp, whereby safety is enhanced.

In addition, the amount of the white light source light (visible light) emitted from the rim portion of the convex lens is adjusted by repeated reflecting of the light source light within the light source unit so that the intensity of the white light is reduced to the point where glare is not caused.

The infrared light transmitting film can be formed directly on the convex lens, in which case the lamp structure is uncomplicated. On the other hand, by forming the infrared light transmitting film on a separate transparent plate, since the interior of the lamp chamber does not heat up as much as the convex lens, heat-induced deterioration of the infrared light transmitting film is prevented, thereby ensuring a stabilized amount of infrared light over long periods.

Furthermore, when replacing the transparent plate (infrared light transmitting filter) on which the infrared light transmitting film is formed, it is possible to replace only the infrared light transmitting filter without replacing other lamp component parts, and therefore maintenance costs are also kept low.

In addition, since the transparent plate is of a small size compared to the lens, it is possible to increase the number of components put at one time in a vapor deposition furnace used for forming the infrared light transmitting film, thereby reducing costs related to forming the infrared light transmitting film.

Moreover, since the light shielding member can be readily integrated with the lens holder, the structure is simple, manufacturing is easy, and the assembly is light in weight, thus making it most suitable for mass production.

Because the convex lens does not emit red light in a striped pattern due to light reflected from the extending end portion of the light shielding member, the risk of drivers or pedestrians mistaking the lamp for a tail lamp or stop lamp is further eliminated, by which safety is further enhanced.

It should further be apparent to those skilled in the art that various changes in form and detail of the invention as shown and described above may be made. It is intended that such changes be included within the spirit and scope of the claims appended hereto.

The invention claimed is:

1. A vehicular infrared light radiating lamp including a light source unit comprising: a reflector, a light source mounted on said reflector, a tubular lens holder, a convex lens mounted via said tubular lens holder forward of said reflector, an infrared light transmitting film provided in and traversing a light path between said reflector and said convex lens, an infrared light transmitting film-free region being provided on an outer periphery of said infrared light transmitting film such that visible light from said light source is emitted from a rim portion of said convex lens, and a light shielding member provided on said lens holder and disposed to the rear of said rim portion of said convex lens for blocking light in a direct path between said light source and reflector and said infrared light transmitting film-free region while allowing other visible light to enter said infrared light transmitting film-free region.

2. The vehicular infrared light radiating lamp according to claim 1, wherein said infrared light transmitting film is formed on a rear surface of said convex lens.

3. The vehicular infrared light radiating lamp according to claim 1, further comprising a transparent plate disposed to the rear of and parallel to a rear surface of said convex lens, said infrared light transmitting film being formed on said transparent plate.

4. The vehicular infrared light radiating lamp according to claim 3, wherein said transparent plate is disposed between said rear surface of said convex lens and said light shielding member.

5. The vehicular infrared light radiating lamp according to claim 4, wherein said transparent plate is spaced from said rear surface of said convex lens.

6. The vehicular infrared light radiating lamp according to claim 3, wherein said transparent plate is disposed between rearward of said light shielding member and spaced from said light shielding member.

7. The vehicular infrared light radiating lamp according to claim 1, wherein said light shielding member extends in a stepped configuration on an inner side of a lens engaging portion on a front edge portion of said lens holder.

8. The vehicular infrared light radiating lamp according to claim 1, wherein a radially inward end portion of said light shielding member has a tapered shape.

9. The vehicular infrared light radiating lamp according to claim 8, wherein said radially inward end portion of said light shielding member is non-reflective.

10. The vehicular infrared light radiating lamp according to claim 5, wherein said radially inward end portion of said light shielding member is treated with a blackening treatment.

11. The vehicular infrared light radiating lamp according to claim 1, wherein step portions for mounting said convex lens are formed at a plurality of locations substantially equally spaced in a circumferential direction on a lens engaging portion on a front edge of the lens holder, said step portions being notched in an arc shape with tapered inner peripheral surfaces diametrically expanding forward.

12. The vehicular infrared light radiating lamp according to claim 1, wherein said other light comprises light reflected from said infrared light transmitting film.

13. The vehicular infrared light radiating lamp according to claim 1, wherein said infrared light transmitting film passes at least some non-red visible light.

14. A vehicular infrared light radiating lamp including a light source unit comprising: a reflector, a light source mounted on said reflector, a tubular lens holder, a convex lens mounted via said tubular lens holder forward of said reflector, an infrared light transmitting film provided in and traversing a light path between said reflector and said convex lens, an infrared light transmitting film-free region being provided on an outer periphery of said infrared light transmitting film such that visible light from said light source is emitted from a rim portion of said convex lens, and means for blocking light in a direct path between said light source and reflector and said infrared light transmitting film-free region while allowing other visible light to enter said infrared light transmitting film-free region.

* * * * *